Dec. 27, 1949    J. A. RICHARDS    2,492,654
HIGH-CAPACITY INTERNAL-COMBUSTION HEATER
FOR INSTALLATIONS OF LIMITED SIZE
Filed Dec. 22, 1945    5 Sheets-Sheet 1

INVENTOR.
JOHN A. RICHARDS
BY
Mueller & Mason
ATTORNEYS

Dec. 27, 1949  J. A. RICHARDS  2,492,654
HIGH-CAPACITY INTERNAL-COMBUSTION HEATER
FOR INSTALLATIONS OF LIMITED SIZE
Filed Dec. 22, 1945  5 Sheets-Sheet 2

INVENTOR.
JOHN A. RICHARDS
BY
Mueller and Mason
ATTORNEYS

Dec. 27, 1949  J. A. RICHARDS  2,492,654
HIGH-CAPACITY INTERNAL-COMBUSTION HEATER
FOR INSTALLATIONS OF LIMITED SIZE
Filed Dec. 22, 1945  5 Sheets-Sheet 3

INVENTOR.
JOHN A. RICHARDS
BY
ATTORNEYS

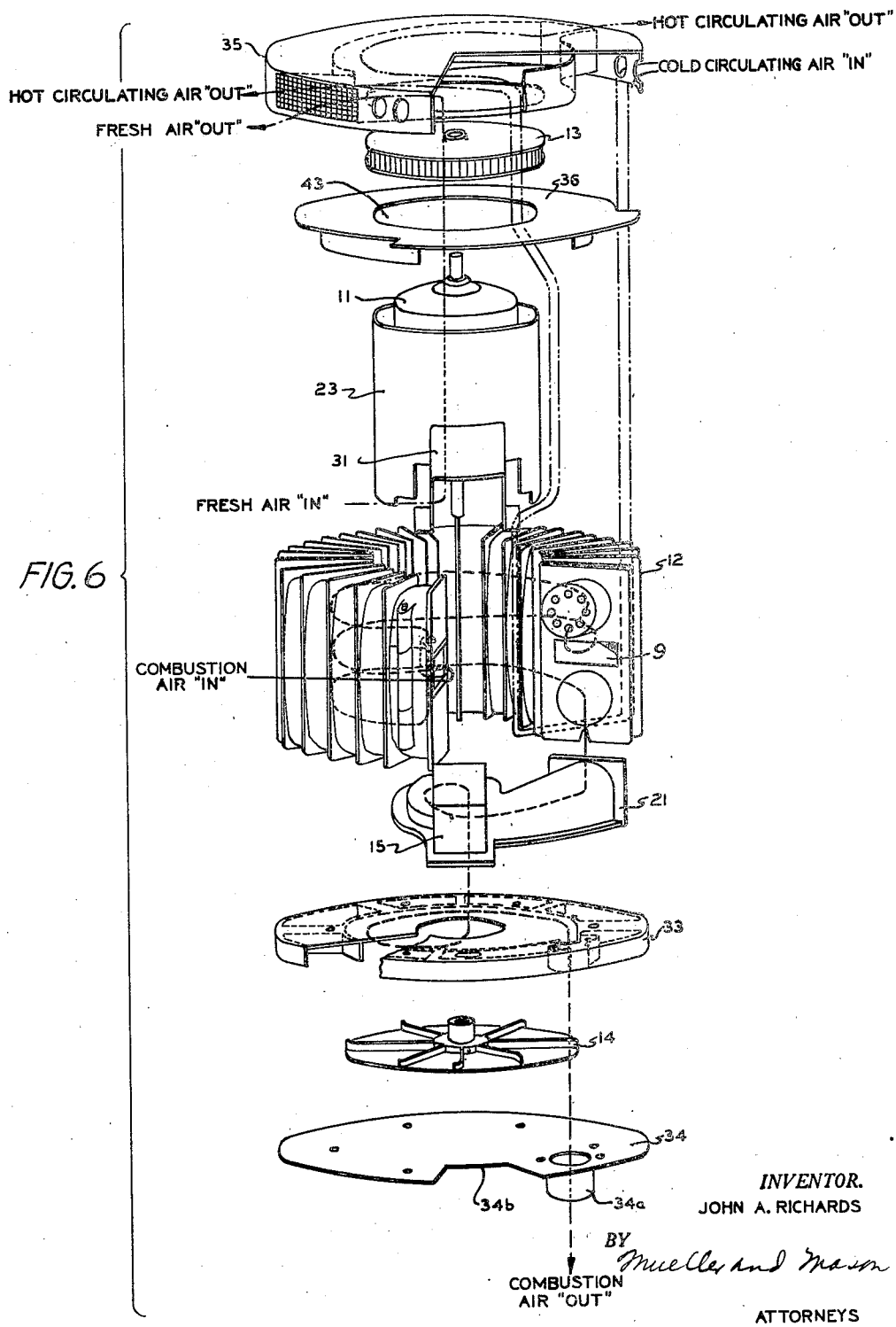

Dec. 27, 1949 J. A. RICHARDS 2,492,654
HIGH-CAPACITY INTERNAL-COMBUSTION HEATER
FOR INSTALLATIONS OF LIMITED SIZE
Filed Dec. 22, 1945 5 Sheets-Sheet 5

INVENTOR.
JOHN A. RICHARDS
BY
ATTORNEYS

Patented Dec. 27, 1949

2,492,654

UNITED STATES PATENT OFFICE 2,492,654

HIGH-CAPACITY INTERNAL-COMBUSTION HEATER FOR INSTALLATIONS OF LIMITED SIZE

John A. Richards, Chicago, Ill., assignor to Motorola, Inc., a corporation of Illinois Application December 22, 1945, Serial No. 636,581

7 Claims. (Cl. 126—110)

This invention relates generally to heating devices and in particular to a heater of the internal combustion type adapted especially for mounting on an automobile and operable entirely independent of the automobile engine.

In the prior art automobile heaters of the internal combustion type there have been many which were dependent upon the automobile engine for operation. These heaters operate on a relatively high pressure air supply, produced by the engine power, to suitably atomize the fuel to be burned and to maintain a positive flow of the combustible and burning mixture through the heater, or are of the suction type and obtain suction by connection with the intake manifold of the engine, which likewise results in high negative pressure operation. The heaters, therefore, are dependent for their operation upon concurrent operation of the engine and are directly responsive to engine running conditions. Due to variations in engine operation, and hence pressures in the heater, the conditions in the combustion chamber are subject to great variation so that burning within the heater is not uniform and in some cases may even be stopped by a very sudden change in the quantity of air and fuel supplied to the combustion chamber. Also this fluctuation of the air supply and the consequent surging of the fuel in the combustion chamber result in noisy burning of fuel which is annoying to the passengers in the automobile.

These objections have been overcome by providing internal combustion type heaters which are entirely independent of the automobile engine for operation. Examples of this type of heater are disclosed in Holthouse Patents 2,286,853 and 2,286,854 and others of a similar nature. The present invention which is independent of the engine represents another improvement over the prior art. The principal problem involved in such heaters is that the only source of power available for igniting the fuel, providing movement of the fuel and products of combustion through the combustion chamber, and circulating the air to be heated through the heater is the 6 volt storage battery of the automobile. This battery must provide power for the various electrical equipment of the automobile; hence, a limited amount of current and consequently a small amount of power is available for operation of the heater. As sufficient power is not available to insure a flow of combustion air by use of high pressure or strong suction, the heater must be designed in such a way that movement of combustion air and of air to be heated is accomplished without unnecessary restriction which results in a waste of power. This is a particularly important problem as it is essential for satisfactory operation of the heater that the burning of the fuel be steady and complete and to accomplish this the combustion air and products of combustion must move through the combustion chamber and be exhausted in a steady uniform flow.

Another problem in internal combustion automobile heaters is that the products of combustion and the exhaust from the combustion chamber must be completely sealed from the air which is circulated and used to heat the automobile. This is essential as the exhaust from the combustion chamber contains gases such as carbon monoxide which are dangerous to human life. At the same time, the matter of size is particularly important for heaters which are adapted to be installed any place on an automobile and particularly under the front seat of the automobile to supply heated air to both front and rear compartments of the automobile as very small clearance is provided in modern automobiles.

It is an object of this invention, therefore, to provide a compact internal combustion heater adapted for vehicular installation and use entirely independently of the automobile engine, and adapted for portable as well as fixed mountings.

It is an additional object of the invention to provide a compact internal combustion heater having means for providing a suction for drawing air and products of combustion through the combustion chamber of the heater and cause them to be exhausted.

It is a further object of this invention to provide a compact internal combustion heater particularly adapted for automobile installation and having its components so arranged that the passages for the air to be heated are in easy access to the interior of the automobile while the passages for the introduction of combustion air and for the discharge of exhaust gases are isolated therefrom.

A feature of this invention is the provision of an internal combustion heater particularly adapted for automobile installation having the components so arranged that the passage for air being heated and means for circulating the air to be heated are positioned at one end of the unit to be mounted adjacent to the interior of the automobile and the intake and exhaust for combustion air and means for moving the combustion air in the combustion chamber are arranged at the other end of the unit, remote from the automobile thereby facilitating the removal of the exhaust gases from the automobile and preventing the contamination of the circulated air therewith.

An additional feature of the invention is the provision of a small compact self-contained unit in a cylindrical walled housing wherein the combustion chamber has a large radiating surface substantially all of which is accessible to the air which is being heated, resulting in rapid and efficient heating of the air.

A further feature of the invention is the provision of a passage in the combustion and exhaust structure for preheating the combustion air prior to mixture with the fuel, producing more complete mixing of the air and fuel and accordingly more complete combustion thereof.

Still another feature of the invention is the provision of an internal combustion heating unit having a substantially C-shaped combustion and exhaust structure thereby providing an arcuate space at the break in the C wherein the components operatively associated with the combustion and exhaust structure are installed and a central cylindrical space for the heater motor, forming a compact and efficient structure suitable for general portable use, and in particular adapted for installation in an automobile.

Further objects, features and advantages of this invention will be apparent from the following description when taken in connection with the accompanying drawings in which:

Fig. 6 is a developed view of the operating portions of the heater and includes a diagrammatic illustration of air flow therein;

Figure 1:
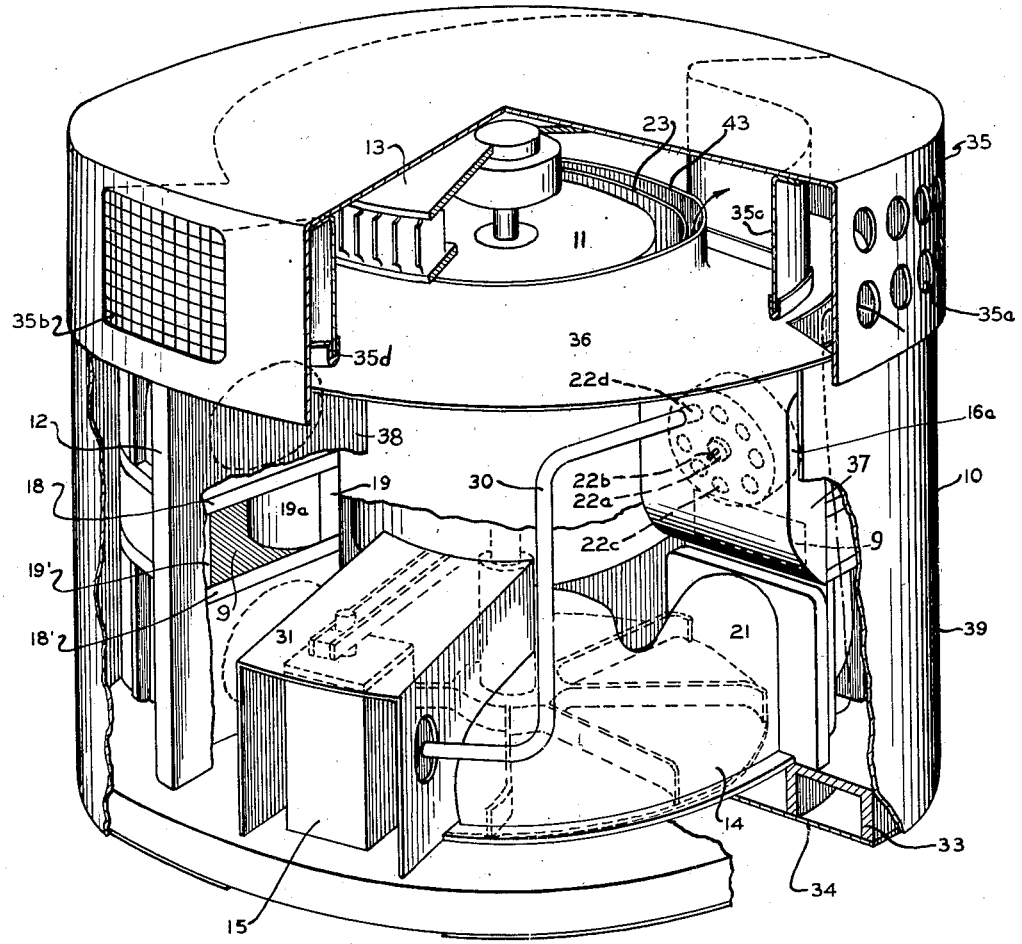
Fig. 1 is a perspective view with a section of the housing broken away, showing the heater of this invention.

In practicing my invention I provide a self-contained compact unit having a cylindrical walled housing. There is provided in the housing a combustion and exhaust structure of substantially C-shape, leaving an arcuate space at the break in the C within the housing for location of components operatively connected to the combustion and exhaust structure. An igniter unit and fuel feeding means for providing fuel to the igniter unit are positioned in this arcuate space with the igniter unit operatively connected at the combustion opening of said combustion and exhaust structure. A motor is positioned in the cylindrical space surrounded by the combustion and exhaust structure and has a shaft extending axially at either end thereof. A fan for circulating air around the combustion and exhaust structure longitudinally within the housing is connected to the motor shaft at one end thereof and a worm gear for driving the fuel feeding means and a fan for creating a suction for the combustion and exhaust structure are connected to the motor shaft at the other end. The cylindrical housing of the heater includes partitions to provide a passage around the combustion and exhaust structure for air to be heated and a separate passage for intake of combustion air and exhaust from the combustion and exhaust structure. The passage for circulating air is arranged with openings at the top of the heater to facilitate circulation of air from the passenger compartment of the automobile through the heater. The passage for combustion air includes a section within the combustion and exhaust structure for preheating the air prior to mixture with the fuel. This passage is provided with an opening at the bottom of the heater providing for easy elimination of the exhaust from the combustion and exhaust structure. This arrangement eliminates any possibility of the products of combustion, which include gases dangerous to human lives, entering the passenger compartment of the automobile. Also, as suction is used for moving the air through the combustion chamber, a small negative pressure is provided preventing gas from escaping from the heater.

Referring now to the drawings there is shown in Figs. 1 to 6, a structure which is the preferred embodiment of the invention. The same reference characters are used to designate corresponding components in the various figures of the drawing. The heater is comprised of a cylindrical housing 10, a motor 11, a combustion and exhaust structure 12, a circulating fan 13, a suction fan 14, and a fuel pump 15.

Figure 2:
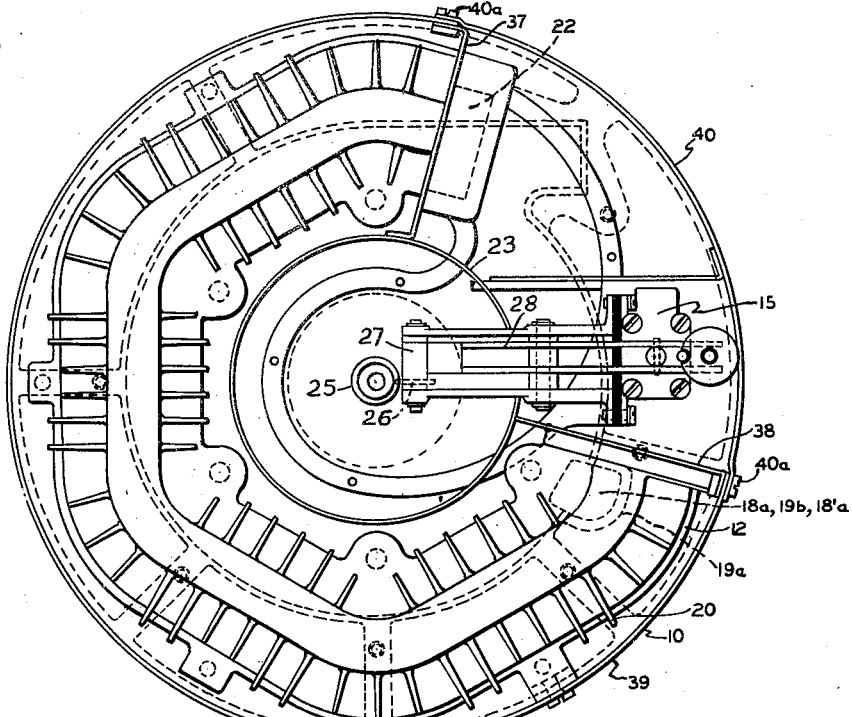
Fig. 2 is a top view approximately along the line 2—2 of Fig. 3 with the motor removed.
Figure 3:
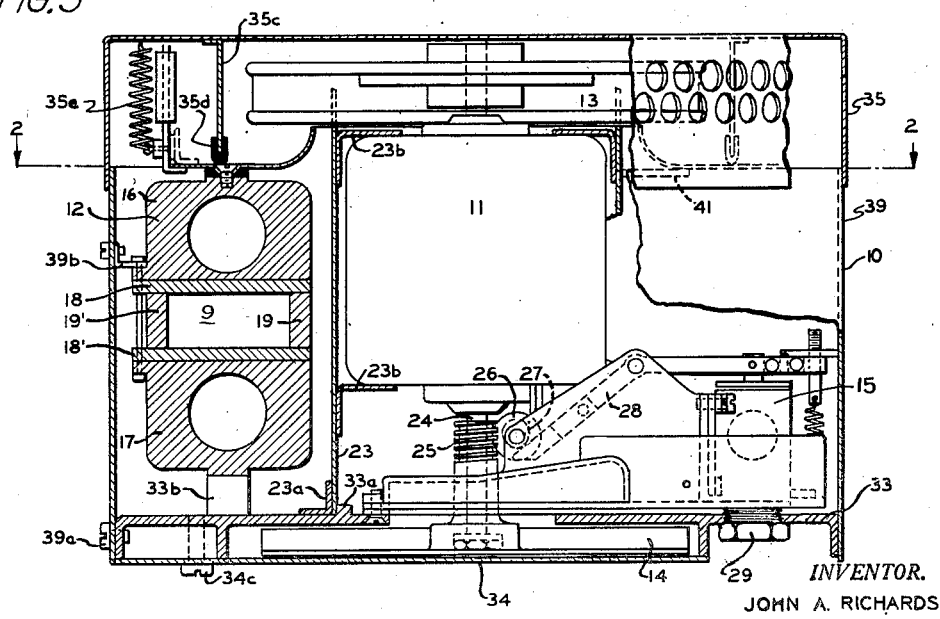
Fig. 3 is a side view showing the structure of Fig. 2 as well as the top portion of heater in assembled position.
Figure 5:
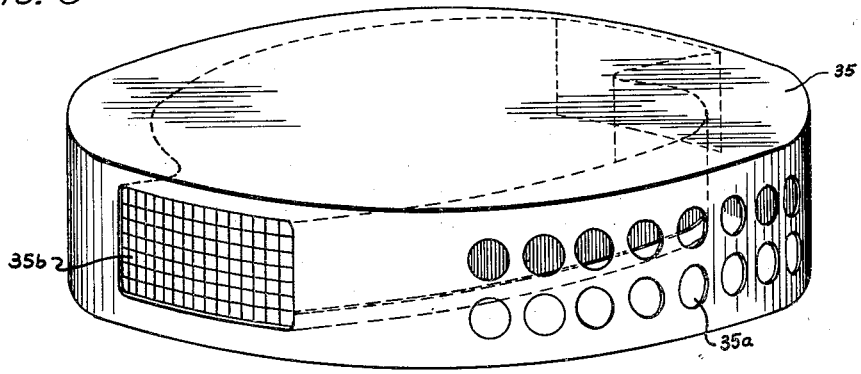
Fig. 5 is a view of the top portion of the housing.

As shown in Figs. 2 and 3, the combustion and exhaust structure 12 is a substantially C-shaped duct structure extending through an arc of substantially 270°. The combustion and exhaust structure 12, is made up of two trough shaped parts 16 and 17 which are cast of aluminum or a like material and are bolted or otherwise secured together with dividing members 18 and 18' and spacing members 19 and 19' which are cast of the same material positioned therebetween. The castings 16 and 17 are formed with fins 20 extending therefrom providing an extended radiating surface for the combustion chamber. This assembly provides an upper and lower passage so arranged that a continuous combustion chamber is formed starting from the combustion opening 16a (Fig. 1) in member 16, continuing around the upper casting substantially 270° then through an opening 19b in the enlarged portion 19a of the spacing member 19 into lower member 17 and extending through this casting to the exhaust opening directly below the combustion opening. Dividing members 18 and 18' have openings 18a and 18'a corresponding to the opening 19b in spacing member 19. The spacing members 19 and 19' together with the dividing members 18 and 18' provide a passage 9 positioned between the passages of the combustion chamber for preheating the combustion air. By using a plurality of easily cast parts and securing them together in this manner, an inexpensive structure is provided.

The combustion and exhaust structure is mounted on the base member 33 which is the main supporting member for the heater. Casting 21 which connects the exhaust opening of the combustion and exhaust structure to the exhaust fan is used to secure one end of the combustion and exhaust structure to the base member 33 and spacing members 33b support the other end of the combustion and exhaust structure. The spacing members are connected to the combustion and exhaust structure in a manner to permit expansion and contraction of this structure.

Fuel igniting means 22 is positioned in the arcuate space at the combustion opening of the combustion chamber. Details of the igniting means 22 are not shown as various units can be used such as that disclosed in United States Patent No. 2,286,854. For the purpose of illustration a ceramic unit having an igniter 22a is shown. A terminal 22b is provided on the igniter for connection to the 6 volt battery power supply of the automobile. Openings 22c are provided in the igniter 22 to permit entrance of air into the combustion chamber and opening 22d is provided for entrance of fuel.

The motor 11 is surrounded by shield 23 and is positioned in the central annular space within the combustion and exhaust structure. The motor shield 23 is positioned on the base member 33 by rim 33a and is secured to the base member by brackets 23a. The motor 11 is in turn supported in the motor shield by brackets 23b. The motor has a shaft 24 extending on either end thereof. The circulating fan 13 is mounted on and driven by one end of the shaft, and the suction fan 14 and fuel pump 15, are driven by the other end thereof. Pump 15 is mounted on base member 33 in the arcuate space intermediate the ends of the castings and is driven by a worm gear 25 on the motor shaft operating through gear 26, cam 27, and crank 28, which provide a reciprocal movement for operating the pump. The details of the pump are not shown as this forms no part of the present invention. The pump has a fitting 29 for connection to a gasoline supply and a feed line 30 connecting the pump to the fuel igniting means 22. A housing 31 is placed over the pump to provide a passage for air thereover for maintaining the pump at proper operating temperature.

The base member 33 together with the bottom cover 34 which is secured thereto by screws 34c form a housing for the suction fan 14, which is of the impeller type and is connected to the exhaust opening in the combustion and exhaust structure by casting 21. The base member 33 has recesses formed therein so that rotation of the impeller 14 creates a suction in the combustion and exhaust structure and causes air to be drawn therethrough and exhausted through the outlet 34a of the bottom cover 34 (Fig. 6). The bottom cover 34 includes a recess 34b for the gasoline supply fitting 29, but otherwise completely closes the bottom of the heater.

Figure 4:
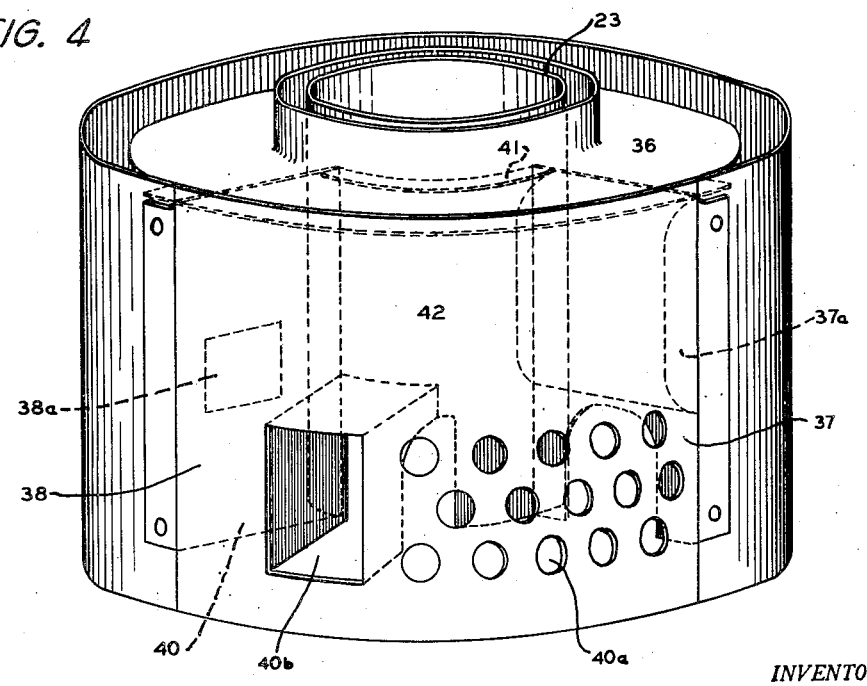
Fig. 4 is a perspective view of the housing for the heater and including certain internal portions thereof.

The housing 10 is composed of a wrap-around cover 39 secured to the base member 33 by screws 39a and to the combustion and exhaust structure by brackets 39b. The front cover member 40 is secured to the wrap-around housing by screws 40a and can be removed to provide access to the operating components of the heater which are located in the arcuate space. The front cover member 40 together with top partition member 36, side partition members 37 and 38, motor shield 23, insulating section 41, and base member 33 completely enclose an air chamber 42 from the remainder of the interior of the housing (Fig. 4). Top partition members 36 and the side partition members 37 and 38 are secured to the combustion and exhaust structure and the insulating section 41 is fastened to top partition member 36 and makes a tight contact with the motor shield 23 and the side partition members 37 and 38. Openings 40a are provided in the cover member for air to enter the chamber 42. This chamber serves as an air supply for the combustion chamber being connected thereto by the opening 38a in partition member 38 and the pre-heating passage 9 in the combustion and exhaust structure formed by spacing members 19 and 19' and dividing members 18 and 18'. The preheated air from this passage is vented to the fuel igniting means 22 by the trough shaped portion 37a of side partition member 37 (Figs. 1 and 4).

The top cover member 35 is secured to the top partition member 36 by a catch such as illustrated at 35e. The top cover 35 forms a housing for the circulating fan 13 and has openings 35a to receive air to be heated and outlets 35b for the heated air. The top cover 35 has a separating member 35c which provides separate compartments for air being received into the heater and the heated air. The member 35c has a sealing edge 35d in contact with the top partition member 36. The member 35c cooperates with the top partition member 36 to form a passage for air which enters through the openings 35a extending around the outside of the combustion and exhaust structure, continuing to the inner side of the combustion and exhaust structure but outside of the motor shield 23, through the openings 43 in the top partition member 36 into the center portion of top cover member 35. As shown in Fig. 3, a gasket is placed between the top partition member 36 and the combustion and exhaust structure to prevent air from passing over this structure instead of going around as described. The circulating fan 13 is of the sirocco type and creates a suction drawing the air around the combustion and exhaust structure and forcing the air out through opening 35b into the space to be heated.

An opening 40b is provided in the front cover 40 which cooperates with the housing 31 over pump 15 to form a passage for fresh air from outside the heater over the pump. The housing 31 fits into a cutaway portion of the motor shield 23 permitting the passage for cold air to extend between the motor 11 and shield 23 and enter the top cover 35. Here the fresh air passage unites with the circulating air passage.

Figure 8:
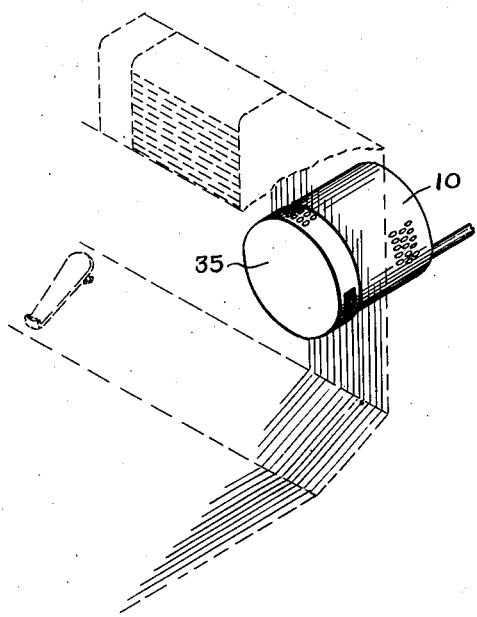
Fig. 8 is a like view of the heater mounted under the dashboard of an automobile.
Figure 7:
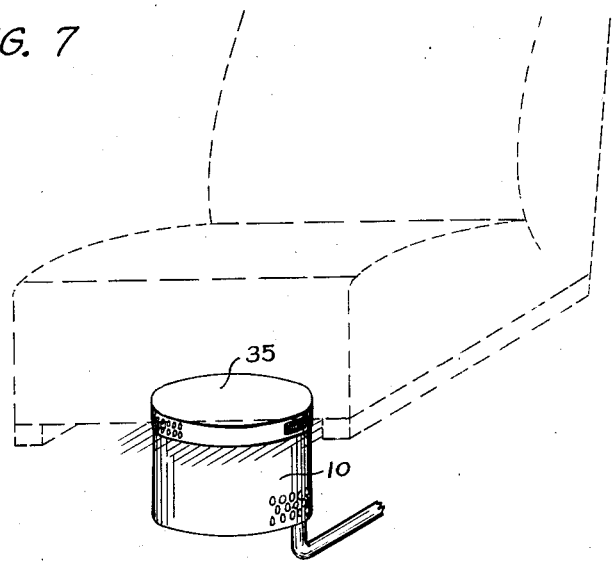
Fig. 7 is a perspective view of the heater mounted under the seat of an automobile.

From an examination of Fig. 6 the mode of operation of the heater is clearly seen. The heater is adapted to be installed under the seat of an automobile as shown in Fig. 7 or under the dashboard of a vehicle as shown in Fig. 8, with the upper portion having the intake openings and outlets for heated air positioned within the passenger compartment of the automobile. The cold air from the passenger compartment is taken in through the openings 35a in the cover member 35 and passes around the outside of the combustion and exhaust structure 12, then through the center thereof, and out through the openings 35b in top cover member. Fan 13 provides a suction which draws the air around the combustion and exhaust structure and forces the heated air through the outlet 11b into the passenger compartment.

The air for combustion enters the air chamber 42 as shown in Fig. 4 and passes through the opening 38a in partition member 38 and through the pre-heating passage 9 in the combustion and exhaust structure and into the trough shaped portion of partition member 37. From here the air is drawn through openings 22c in fuel igniting means 22 into the combustion chamber by suction created by impeller 14. Here the air unites with the fuel supplied by pump 15 and combustion takes place. The products of combustion continue through the combustion and exhaust structure and are drawn out through the casting 21 into the base member 33 and out through the exhaust opening 34a by the suction created by impeller 14. The suction of the impeller creates a uniform steady flow of air through the combustion chamber which results in complete and efficient combustion. A negative pressure is created in the combustion and exhaust structure by the suction, preventing escape of gas therefrom. The exhaust is carried to the rear of the automobile by suitable means so that it cannot enter the passenger compartment of the automobile where it would be dangerous to the passengers therein.

A stream of cold air enters the heater from the outside through openings 40b and is drawn through the housing 31 around the fuel pump and between the motor 11 and motor shield 23 by fan 13 to provide cooling and ventilation for the pump 15 and motor 11. This stream of air mixes with the circulating air in the top member 35 and is passed into the automobile with the circulating air. In addition to providing cooling for the pump and motor this provides a supply of fresh air for the passenger compartment of the automobile.

Thus it can be seen that a compact structure is provided wherein the operating components are positioned in such a way that a minimum of space is required and the components are associated in such a way that very efficient operation results. The passages for combustion air and exhaust from the combustion are effectively sealed from the air which is circulated in the automobile eliminating the possibility of injury to the passengers due to breathing air which contains gases which are dangerous to human life.

Although the invention has been described specifically with reference to a particular structure it is obvious that various alterations and modifications can be made which are within the intended scope of the invention as defined by the appended claims.

I claim:

1. An internal combustion heater comprising a substantially C-shaped combustion and exhaust structure having an interior passage for gases conforming generally in its longitudinal extent with the arcuate shape of said structure, said C-shaped structure defining a segmental space between the ends thereof, operating elements for said structure disposed in said segmental space and including a fuel supply device, a feed line extending between said device and said structure to provide fuel for combustion in said interior passage, said fuel supply device having a bulk substantially greater than that of said feed line and occupying a corresponding space within said segmental space, a housing enclosing said C-shaped structure and said segmental space, and air circulating means having a portion partially surrounded by said C-shaped structure and being operable to circulate air through said housing in heat exchange relation to said structure.

2. An internal combustion heater comprising a substantially C-shaped combustion and exhaust structure having an interior passage for gases conforming generally in its longitudinal extent with the arcuate shape of said structure, said C-shaped structure defining a segmental space between the ends thereof, operating elements for said combustion and exhaust structure disposed in said segmental space and including a fuel supply device having relatively movable parts adapted by their relative movement to provide a measured flow of fuel therethrough to said structure for combustion in said interior passage, a housing enclosing said C-shaped structure and said segmental space, said housing having a removable portion thereof adjoining said segmental space for enabling access to be had through said housing to the operating elements in said space, and air circulating means having a portion partially surrounded by said C-shaped structure and being operable to circulate air through said housing in heat exchange relation to said structure.

3. An internal combustion heater comprising a substantially C-shaped combustion and exhaust structure having an interior passage for gasses conforming generally in its longitudinal extent with the arcuate shape of said structure, said C-shaped structure defining a segmental space between the ends thereof and a central space partially surrounded by said structure, a housing for said heater including a cylindrical walled portion extending around said C-shaped structure and having a removable cover portion extending across the front of said segmental space, whereby access may be had to said space when said cover portion is removed, operating elements for said combustion and exhaust structure disposed in said segmental space and including a fuel supply device, said operating elements requiring occasional access thereto for servicing and other purposes, a fan for circulating air in heat exchange relation to said structure, said housing having air inlet and outlet openings therein for the circulation of air therethrough, and a driving motor for said fan disposed in said central space.

4. An internal combustion heater comprising a substantially C-shaped combustion and exhaust structure having an interior passage for gases conforming generally in its longitudinal extent with the arcuate shape of said structure, said C-shaped structure defining a segmental space between the ends thereof and a central space partially surrounded by said structure, operating elements for said combustion and exhaust structure disposed in said segmental space and including a fuel pump for providing a flow of fuel therethrough to said structure for combustion in said interior passage, an electric motor disposed in said central space, a driving connection from said motor to said pump, an air circulating fan driven by said motor, and a housing for said heater enclosing said C-shaped structure and said segmental space, said housing having air inlet and outlet openings therein for the circulation of air therethrough by said fan.

5. An internal combustion heater comprising a substantially C-shaped combustion and exhaust structure having an interior passage for gases conforming generally in its longitudinal extent with the arcuate shape of said structure, said C-shaped structure defining a segmental space between the ends thereof and a central space partially surrounded by said structure, operating elements for said structure disposed in said segmental space and including a fuel supply device having relatively movable parts adapted by their relative movement to provide a measured flow of fuel therethrough to said structure for combustion in said interior passage, a feed line extending from said device to one end of said passage, said fuel supply device having a bulk several times greater than that of said feed line and occupying a corresponding space within said segmental space, an electric motor disposed in said central space, an exhaust fan at one end of said motor driven thereby and communicating with an end of said interior passage to produce a flow of gases in said passage, an air circulating fan at the other end of said motor driven thereby for circulating air in heat exchange relation to said structure, and a housing enclosing said C-shaped structure and said segmental space, said housing having air inlet and outlet openings therein for the circulation of air therethrough.

6. An internal combustion heater comprising a substantially C-shaped combustion and exhaust structure having in the interior thereof two superposed passages for gases, each of said passages conforming generally in its longitudinal extent with the arcuate shape of said structure and communicating at one end thereof with an adjacent end of the other passage, said C-shaped structure defining a segmental space between the ends thereof and a central space partially surrounded by said structure, operating elements for said structure disposed in said segmental space and including a fuel supply device, a feed line extending from said device to said structure to provide fuel for combustion in said interior passages, said fuel supply device having a bulk substantially greater than that of said feed line and occupying a corresponding space within said segmental space, a housing enclosing said C-shaped structure and said segmental space, said housing having air inlet and outlet openings therein, and air circulating means disposed in part within said central space for producing a flow of air through said housing in heat exchange relation to said structure.

7. An internal combustion heater comprising a substantially C-shaped combustion and exhaust structure having an interior passage for gases conforming generally in its longitudinal extent with the arcuate shape of said structure, said C-shaped structure defining a segmental space between the ends thereof, operating elements for said structure including a fuel supply device adapted to furnish liquid fuel for consumption in said interior passage, said operating elements requiring occasional access thereto for servicing and other purposes, a housing enclosing said C-shaped structure and said segmental space and including a removable section adjoining said segmental space whereby access to said space may be had by removing said section, a fuel feed line extending from said fuel supply device to said structure, said fuel supply device having a bulk several times greater than that of said feed line and occupying a corresponding space within said segmental space, and air circulating means having a portion partially surrounded by said C-shaped structure and being operable to circulate air through said housing in heat exchange relation to said structure.

JOHN A. RICHARDS.

REFERENCES CITED

The following references are of record in the file of this patent:

UNITED STATES PATENTS

| Number | Name | Date |
| --- | --- | --- |
| 2,015,195 | Sadwith | Sept. 24, 1935 |
| 2,165,269 | Karsel | July 11, 1939 |
| 2,207,776 | Black | July 16, 1940 |
| 2,314,089 | Hess et al. | Mar. 16, 1943 |
| 2,336,609 | Herbster | Dec. 14, 1943 |
| 2,386,462 | Hess | Oct. 9, 1945 |
| 2,388,970 | Hess et al. | Nov. 13, 1945 |